Patented June 17, 1952

2,600,404

UNITED STATES PATENT OFFICE 2,600,404

TREATMENT OF WELL-DRILLING FLUIDS

Raymond W. Hoeppel, Arcadia, Calif., assignor to National Lead Company, New York, N. Y., a corporation of New Jersey No Drawing. Application July 13, 1948, Serial No. 38,569

9 Claims. (Cl. 252—8.5)

This invention relates to the art of drilling wells by the employment of well-drilling fluids and more particularly starchy drilling fluids.

In the drilling of the wells such as oil and gas wells and particularly by the rotary method, an aqueous drilling fluid is employed. Such a drilling fluid has a water phase and a solid phase which later may be a native drilling clay. A concentrated colloidal clay, such as bentonite, of the Wyoming-South Dakota type, may, however, be employed, as may also be employed a fuller's earth of the Georgia-Florida type, the latter particularly where salt water is encountered. In order to attain a low water loss, a starchy material may be employed, the starch being gelatinized or pasted, as by boiling in hot water or by alkalizing with sodium hydroxide.

While a starchy drilling fluid may be employed to advantage in fresh water drilling fluids, it is of particular advantage in salt water drilling fluids, or where salt water is encountered during the course of drilling. Starch is, however, subject to deterioration during the course of drilling. Such deterioration may, however, be inhibited by the employment of a saturated sodium chloride brine, by the employment of a preserving agent such as paraformaldehyde, or by maintaining the drilling fluid at a pH of about 12. Where cement is encountered during the course of drilling, as by the drilling out of a cement plug, the drilling fluid is deleteriously affected and treatment with sodium bicarbonate has been practiced.

In the drilling of wells, considerable difficulty is encountered from the swelling of formation clays. Such swelling may cause shale formations to heave and fall into the hole. Also, minute amounts of clay in production sands are swelled by fresh water drilling fluids with a resultant great decrease in porosity and a low rate of oil recovery. It is known that such swelling can be largely prevented by the use of a sodium chloride brine mud but such a mud unfortunately has a high water loss to the formation unless it contains organic colloids like gums or pregelatinized starches.

Calcium and magnesium chloride brines dehydrate to an even greater extent than sodium chloride brines and hence are more satisfactory for the prevention of swelling of clays. Fortunately, these latter brines have two other features in addition to their dehydrating effect, namely: (1) they will swell or gelatinize starches at low temperatures, and (2) they will preserve starches from decomposition. This invention takes advantage of these latter two attributes of the brines.

One of the objects of this invention is, therefore, to provide for treatment of drilling fluids and more particularly starchy drilling fluids, in a novel manner and to secure improved results.

Further objects will appear from the detail description in which will be set forth a number of embodiments of this invention. It is to be understood, however, that this invention is susceptible of various embodiments within the scope of the appended claims without departing from the spirit of this invention.

Generally stated and in accordance with illustrative embodiments of this invention, an ungelatinized starchy material is subjected to the action of a brine of a concentration and at a temperature sufficient to gelatinize the starchy material. Illustrative of a class of brines suitable for this purpose are the chlorides, bromides, iodides and nitrates of magnesium, calcium, strontium, barium, ammonium, sodium, potassium, manganese and zinc. The concentration of the brine to accomplish gelatinization of the starchy materials is generally higher than that required to preserve the resulting fluid against deterioration during the course of drilling. Accordingly, it is economical and convenient to then reduce the concentration but only to an extent sufficient to still preserve the starchy material; for that purpose a concentration of 10% is sufficient. The aqueous starchy fluid may be one in which the solid phase is a starchy material. However, it is desirable and convenient to employ such a drilling fluid containing also a suitable drilling clay. To accomplish this the clay may be added to the brine containing the gelatinized starchy material, or the brine may initially contain the clay; in the former case, the clay may be added to the brine before or after the concentration has been reduced.

Where a drilling fluid is subject to contamination by cement, this can be counteracted by the addition of sufficient magnesium chloride to counteract the deleterious action of the cement.

Various starchy raw materials may be employed, the principal ones of which are the starches of potato, tapioca, corn, rice, wheat, arrowroot, Amioca (waxy maize), sago, Yucca, sweet potato, taro, canna, Maranta, Brazilian arrowroot. A number of these starchy materials may be employed raw; for instance, potato, sweet potato, rice, taro meal, wheat flour, tapioca (Java or Santo Domingo). Yucca, tapioca and Brazilian arrowroot are different names for starch from the Manihot root, which is grown both in the East Indies, the West Indies and South America. The Yucca starch is from Venezuela, the Brazilian arrowroot from Brazil, the Karpen tapioca from Java, and the Sando tapioca from Santo Domingo. The arrowroot S. H. is a plain arrowroot and is from the Maranta plant. The St. Vincent arrowroot is a root starch from either a Maranta or canna species. Amioca is a designation for starch from waxy maize; sago is a starch from the stalk of a palm tree.

The taro, canna and potato starches all have very low gelatinization temperatures in salt water. Next are the three Manihot starches designated as Yucca and two different kinds of tapioca, which are also root starches. Those root starches having higher gelatinizing temperatures in salt water are sweet potato and St. Vincent arrowroot. Taro, canna, potato and Manihot (which latter includes tapioca, cassava and Brazilian arrowroot), gelatinize in salt water 30° F. lower than common starches, such as corn and wheat, and in the case of potato starch, as much as 50° F. lower than the latter. This feature will permit the natural bottom hole temperatures to effect gelatinization; for example, potato starch effectively gelatinizes at about 105 to 110° F. in a saturated salt solution, whereas, cornstarch requires a temperature in excess of 160° F. for gelatinization under the same conditions. However, even in the latter case, the bottom hole temperatures may be sufficient to gelatinize the starch because bottom hole temperatures in excess of 160° F. are frequently encountered.

The minimum brine concentration necessary for gelatinization varies with the type of starch, temperature of brine solution, and the type of salt used in preparing the brine. In general, the starches requiring the lowest temperatures for gelatinization in pure water will require the lowest brine concentrations for gelatinization at room temperature (60° F.) while those requiring high temperatures for gelatinization in pure water require the highest brine concentrations at room temperature. As the temperature of the solution is raised, the minimum brine concentration for gelatinization decreases. The change in gelatinization temperature of starch with change in brine concentration is not linear however, a rapid change in gelatinization temperature occurring generally within rather narrow limits of brine concentration. For instance, corn starch requires a temperature of about 180° F. for very rapid gelatinization in fresh water, a temperature of about 165° F. in 20% calcium chloride brine and a temperature of only 80° F. for very rapid gelatinization in 27% calcium chloride brine. Consequently, in all instances except where abnormally high well temperatures occur, it is best to employ a brine concentration in slight excess above that producing the greatest rate in change of gelatinization temperature for increment of concentration. For example, where corn starch is used, a calcium chloride concentration-brine concentration of 20% or less would rarely be used, but instead somewhat more than this amount would be employed.

The gelatinizing power of the salts varies with the type of cation or anion present. The order of effectiveness of the cations in producing gelatinization of corn starch appears to be the following, viz: magnesium, calcium, strontium, barium, ammonium, sodium, potassium, manganese, and zinc. It is apparent that the sequence for the alkalis and alkaline earths follows the periodic table. With potato starch the order appears to be barium, strontium, calcium and magnesium.

The order of effectiveness of the anions varies considerably with the type of starch gelatinized. For starches which require a high temperature for gelatinization in pure water (corn and St. Vincent arrowroot starches), the chlorides are appreciably more effective than the nitrates in producing gelatinization. For starches gelatinizing at lower temperature (potato and tapioca starches) the nitrates are considerably more effective than the chlorides.

At 120° F. a temperature below the average of most mud systems, potato starch will gelatinize in calcium nitrate solution as low as 13% solids, whereas 16% calcium chloride is required for gelatinization at this temperature. In the case of St. Vincent arrowroot starch, 23% calcium chloride or 28% calcium nitrate brines are needed for gelatinization at this temperature, 120° F.

Ungelatinized starches dissolve in brine of 30% or more calcium chloride or 26% or more magnesium chloride, with an attendant great decrease in rate of gelatinization. Starches thus dissolved will rapidly gelatinize on diluting the brine to a concentration known to produce gelatinization, but if deluted too much (below the minimum concentration for gelatinization), the starch will precipitate out of solution ungelatinized. Thus, ungelatinized corn starch, for example, dissolved in cold 36% calcium chloride solution will precipitate out when the solution is rapidly diluted to 18 per cent solids. However, starches will slowly gelatinize even in concentrated solutions, for instance, in 40% calcium chloride, especially at temperatures above 120° F.

The presence of clay solids in a brine does not appreciably affect its gelatinizing action on ungelatinized starchy materials. Consequently, the dry ungelatinized starch may be added directly to a clay-laden drilling fluid containing a brine concentration in excess of the minimum required for gelatinization. However, to reduce the cost of the drilling fluid, it is generally better to gelatinize the starch in a brine solution and then dilute it to a concentration known to preserve the starch before adding the clay solids. When calcium or magnesium chlorides are used for gelatinization, the starch is adequately preserved if the brine concentration is maintained above 12% solids, whereas with salt brines, at least 23% sodium chloride is required.

The most practical brines for commercial use, from economical and convenient standpoints, are in the order of preference: calcium chloride, magnesium chloride, sodium nitrate, and sodium chloride. Inasmuch as the most readily gelatinized potato starch requires at least 16% calcium chloride for gelatinization at 120° F. and inasmuch as a 10 to 12% brine concentration is required for preservation, the minimum concentration of calcium chloride likely to be used in a drilling fluid containing clay, will not generally be less than 8 to 10% solids, based on the weight of the liquid phase, unless other chemical preserving agents, such as paraformaldehyde are present. The maximum concentration may be as high as that of a saturated solution, but lower concentrations, not over 30%, are more desirable in order to produce a satisfactory gel strength in the drilling fluid. Higher concentrations may sometimes be desired to better dehydrate shales and oil sands or to increase the mud weight. These same limits may also apply to magnesium chloride as they do to calcium chloride.

Minimum concentrations of sodium nitrate in the liquid phase of the drilling fluid will ordinarily never be below 14% solids, while the maximum concentration will be that of a saturated solution. In order to preserve the starch it is desirable to maintain a sodium nitrate concentration in excess of 22% solids. With sodium chloride the minimum concentration that may be used, will ordinarily not be lower than 22%, as distinguished from a saturated solution of sodium chloride containing 26% solids. Only the most readily gelatinizable starches will ordinarily be used with either of these sodium salts, whereas, many starchy materials can be gelatinized and use with calcium or magnesium chloride brines. Combinations of the various salts may often be used to advantage in producing a brine.

In order to more fully disclose the advantageous features of applicant's invention, a number of examples will be given.

*Table 1.—Estimated minimum brine concentrations required to rapidly gelatinize various starches at 75° F.*

[Minimum brine concentration in percent for rapid [1] gelatinization of starches.]

| Brine Used Type | Potato | Tapioca | Corn | St. Vincent Arrowroot |
|---|---|---|---|---|
| $CaCl_2$ | 21 | 22 | 26 | 27 |
| $MgCl_2$ | | | 26 | |
| $MnCl_2$ | | | >25 <40 | |
| $ZnCl_2$ | | | >20 <40 | |

[1] Slow gelatinization generally occurs at brine concentration 1 to 2% below those shown for rapid gelatinization.

In Tables 1 and 2 are shown the approximate minimum concentrations of various types of brines required for the rapid gelatinization of potato, tapioca, corn and St. Vincent arrowroot starches at 75° F. and 120° F. respectively. Slow gelatinization occurs at brine concentrations 1 to 2% lower than those shown for rapid gelatinization.

*Table 2.—Estimated minimum brine concentration required to rapidly gelatinize various starches at 120° F.*

[Minimum brine concentrations in percent for rapid [1] gelatinization of starches.]

| Brine Used Type | Potato | Tapioca | Corn | St. Vincent Arrowroot |
|---|---|---|---|---|
| $CaCl_2$ | 16 | 21 | 25 | 23 |
| $Ca(C_2H_3O_2)_2$ | >24 | | | |
| $Ca(NO_3)_2$ | 13 | | | 28 |
| $MgCl_2$ | 18 | 20 | 23 | 22 |
| $BaCl_2$ | <24 | | >30 | |
| $SrCl_2$ | <24 | | <30 | |
| $MnCl_2$ | 26 | | <30 | |
| $ZnCl_2$ | >24 | | >25 <35 | |
| $NaCl$ | 25 | [2]>26 | | |
| $KCl$ | 27 | | | |
| $NH_4Cl$ | 26 | | | |
| $NaNO_3$ | 18 | 25 | >42 | >50 |
| $NH_4NO_3$ | 16 | | | |

[1] Slow gelatinization generally occurs at brine concentration 1 to 2% below those shown for rapid gelatinization.
[2] Sat.

The drilling fluid in the following Tables 3 and 4 is made from a commercial drilling clay mined in California. It will be understood that in the expression 7 lb./bbl. (7 pounds per barrel), the barrel capacity is taken as usual at 42 gallons. G./dl. is the usual abbreviation for grams per decaliter. The practice of taking filtrates, viscosity in centipoises (Stormer), initial and 10 minute gel strength, water loss and pH, are in accordance with standard measurements and in accordance with standard practice. Impermex is a pregelatinized starch made in accordance with United States Patent No. 2,417,307.

*Table 3.—Characteristics of 33/dl. Hiko muds made up in various brines in which Irish potato, tapioca or cornstarch had been gelatinized*

| Brine Used for Gelatinizing | | Starch Used, Type | Temperature during Gelling °F. [1] | (Characteristics of 33 g./dl. Hiko Mud made up in diluted Brine-Starch Suspensions (Starch contents=7 lb./bbl.) Initial | | | | |
|---|---|---|---|---|---|---|---|---|
| Conc.[2] Percent | Type | | | Solids [1] Content of Filtrate Percent | Visc. Cpe. | Init. gel G. | pH | 30' Corr. W. L. WL |
| 12 | $CaCl_2$ | None | 75 | 12.0 | 3.4 | 2 | 7.70 | 76.0 |
| 23 | $CaCl_2$ | Potato | 75 | 12.8 | 29.0 | 2 | 7.90 | 4.45 |
| 23 | $CaCl_2$ | Tapioca | 75 | 12.8 | 25.0 | 2 | 7.90 | 3.85 |
| 26 | $CaCl_2$ | Corn | 75 | 14.4 | 25.0 | 2 | 7.75 | 4.05 |
| 16 | $CaCl_2$ | Potato | 120 | 8.9 | 25.0 | 2 | 7.80 | 4.15 |
| 14 | $Ca(NO_3)_2$ | do | 120 | 7.8 | 43 | 8 | 7.80 | 4.00 |
| 20 | $MgCl_2$ | do | 120 | 11.1 | 34.0 | 2 | 7.25 | 3.40 |
| 24 | $SrCl_2$ | do | 120 | 13.3 | 26.5 | 1 | 7.70 | 4.40 |
| 24 | $BaCl_2$ | do | 120 | 13.3 | 24.5 | 0 | 8.00 | 5.30 |
| 24 | $NaCl$ | do | 120 | 13.3 | 40 | 20 | 8.40 | 6.75 |
| 18 | $NaNO_3$ | do | 120 | 10.0 | 33 | 7 | 8.40 | 4.55 |
| 20 | $CaCl_2$ | Tapioca | 120 | 11.1 | 26.0 | 2 | 7.70 | 3.65 |
| 20 | $MgCl_2$ | do | 120 | 11.1 | 29.0 | 10 | 7.25 | 4.60 |
| 24 | $NaNO_3$ | do | 120 | 13.3 | 40 | 25 | 8.40 | 4.00 |
| 28 | $CaCl_2$ | Corn | 120 | 15.6 | 26.0 | 0 | 7.75 | 4.05 |
| 44 | $CaCl_2$ | do | 120 | 24.4 | 37.0 | 0 | 7.55 | 3.35 |
| 24 | $MgCl_2$ | do | 120 | 13.3 | 40.0 | 4 | 6.90 | 2.75 |
| 35 | $ZnCl_2$ | do | 120 | 19.4 | 35.0 | 2 | 5.30 | 3.20 |
| 24 | $MgBr_2$ | Potato | 75 | 13.3 | 63 | 35 | 6.30 | 3.20 |

| AFTER 18 HOURS AT 150° F. | | | | | | | | |
|---|---|---|---|---|---|---|---|---|
| 12 | $CaCl_2$ | None | 75 | 12.0 | 4.0 | 2 | 7.55 | 90.0 |
| 23 | $CaCl_2$ | Potato | 75 | 12.8 | 26.5 | 1 | 7.45 | 3.90 |
| 23 | $CaCl_2$ | Tapioca | 75 | 12.8 | 29.5 | 2 | 7.40 | 3.20 |
| 26 | $CaCl_2$ | Corn | 75 | 14.4 | | | | |
| 16 | $CaCl_2$ | Potato | 120 | 8.9 | 29.0 | 2 | 7.60 | 4.05 |
| 14 | $Ca(NO_3)_2$ | do | 120 | 7.8 | 47 | 12 | 7.60 | 3.65 |
| 20 | $MgCl_2$ | do | 120 | 11.1 | 30.0 | 1 | 6.80 | 3.20 |
| 24 | $SrCl_2$ | do | 120 | 13.3 | 25.0 | 1 | 7.30 | 5.70 |
| 24 | $BaCl_2$ | do | 120 | 13.3 | 19.5 | 0 | 7.80 | 4.85 |
| 24 | $NaCl$ | do | 120 | 13.3 | 26.5 | 3 | 8.20 | 5.15 |
| 18 | $NaNO_3$ | do | 120 | 10.0 | | | | |
| 20 | $CaCl_2$ | Tapioca | 120 | 11.1 | 24.0 | 2 | 7.50 | 3.70 |
| 20 | $MgCl_2$ | do | 120 | 11.1 | 28.0 | 10 | 6.75 | 4.05 |
| 24 | $NaNO_3$ | do | 120 | 13.3 | 40 | 20 | 8.35 | 3.80 |
| 28 | $CaCl_2$ | Corn | 120 | 15.6 | 25.0 | 0 | 7.30 | 3.90 |
| 44 | $CaCl_2$ | do | 120 | 24.4 | 32.0 | 0 | 6.90 | 3.50 |
| 24 | $MgCl_2$ | do | 120 | 13.3 | 37.0 | 2 | 6.55 | 2.75 |
| 35 | $ZnCl_2$ | do | 120 | 19.4 | | | | |

[1] After the starch had been in contact for 30 minutes with the strong brine it was diluted to the lower concentration shown before adding the Hiko clay.
[2] In general, these concentrations are slightly above the minumum required.

Table 4.—*Characteristics of 33/dl. Hiko mud made up in calcium chloride brines in which corn starch had been hydrated and effect of Portland cement and magnesium chloride on such muds*

| Gelatinization | | CaCl₂ in Filtrate [1] Per Cent | Starch in Mud lb./bbl. | Mud Characteristics After 18 hrs. at 150° F.— | | | | |
|---|---|---|---|---|---|---|---|---|
| Starch Used Type | CaCl₂ in Brine Per Cent | | | Visc. Cpe. | Init. Gel G | 10' Gel G | pH | 30' Corr. W. L. WL |
| Ungelatinized Corn Starch | 30 | 16.8 | 6.8 | 29.0 | 3 | 4 | 7.15 | 2.75 |
| Do | 30 | 16.8 | 6.8 | 26.5 | 2 | 3 | 7.25 | 2.80 |
| Impermex | | 16.8 | 6.8 | 22.0 | 3 | 3 | 7.15 | 3.65 |
| Do | | 0 | 7.5 | 21.0 | 20 | 40 | 8.25 | 4.00 |
| PLUS 3 LB./BBL. CEMENT AND AGE 1 DAY AT 150° F. | | | | | | | | |
| Ungelatinized cornstarch | 30 | 16.8 | 6.8 | 25.0 | 2 | | 9.75 | 4.50 |
| Do | 30 | 16.8 | 6.8 | ² 25.0 | 3 | | 7.80 | 3.60 |
| Impermex | | 16.8 | 6.8 | 25.0 | 2 | | 9.90 | 4.20 |
| Do | | 0 | 7.5 | (³) | | | 11.40 | 6.90 |

[1] After the starch had been in contact with the brine for 5 to 10 minutes, the brine was diluted to solids content shown, before adding Hiko clay.
² 3 lb./bbl. MgCl² (anhyd.) added to mud before adding cement.
³ Very thick.

Tables 3 and 4 show that starch-containing fluids made up in calcium chloride brines have low viscosities, very low gel strength, zero gel rates and considerably lower water losses than have fresh water fluids containing equivalent amounts of pregelatinized starch. As the brine concentration is increased, the water loss is even further improved, the gel strength is usually reduced to zero and the viscosity rises slightly, but settling and syneresis become more pronounced. Shales show little tendency to hydrate in such drilling fluids. No preservative other than the calcium chloride present is needed, nor are any mud thinners needed. The fluids are very resistant to all types of contamination likely to be encountered in drilling, except quantities of cement. They are unaffected by cement if a small amount of magnesium chloride is present in the brine as shown above. Maintenance costs of these brine fluids are very low.

When magnesium chloride is used in a brine instead of calcium chloride the characteristics are similar, except for slightly higher viscosities and considerably lower water losses. With sodium nitrate or chloride the gel strengths are considerably higher and the water losses are appreciably higher. All brine fluids are somewhat heavier than normal fresh water fluids due to the higher density of the liquid phase, but stable fluids weighing as little as 75 pounds per cubic foot can be produced. The higher density fluids are, of course, an advantage where increase in specific gravity is desired or required.

Table 5.—*Characteristics of muds obtained by adding 7 lbs./bbl. starch to CaCl₂ brine containing 25 g./dl. Hiko clay*

| Starch used (7 lbs./bbl. used) Type | CaCl₂ Content of Filtrate Per Cent | Initial | | | After 18 hrs. at 130° F.— | | | |
|---|---|---|---|---|---|---|---|---|
| | | Visc. Cpe | Init. Gel G | 30 min. Cor. Water Loss ml. | Visc. Cpe. | Init. Gel G | pH | 30' Corr. W. L. ml. |
| Non-gelatinized corn starch | 28.0 | 31.0 | 2 | 3.75 | 30.0 | 0 | 7.00 | 4.5 |
| Impermex [1] | 0 | 7.8 | 0 | 5.20 | 8.5 | 8 | 9.10 | 5.4 |
| None | 14.5 | 5.5 | 7 | 53.2 | 6.0 | 8 | 7.45 | 62.0 |

[1] 1 lb./bbl. of a preservative-paraformaldehyde present.

The above table shows an example of the gelatinization of corn starch in a brine-containing fluid and it is compared with Impermex, a gelatinized starch with a preservative. However, such a process necessitates the maintenance of a high brine concentration in the fluid unless the fluid is fairly hot. A starch-containing brine may be added to a fresh water mud to lower the water loss but some dilution of the fresh water fluid may be necessary to avoid excessive discosities temporarily produced as it becomes flocculated with the salt.

*Table 6.—Characteristics of 33 g./dl. Hiko mud made up in calcium chloride brines in which oven-dehydrated potatoes had been gelatinized*

| Starch used Type | Gelatinization | | | | | | Initial Mud Characteristics | | | | |
|---|---|---|---|---|---|---|---|---|---|---|---|
| | Initial CaCl₂ Per Cent | Time Min. | 2nd Stage CaCl₂ Per cent | Time Min. | NaCl content of filtrate Per Cent | CaCl₂ content of filtrate Per Cent[1] | Potatoes in mud lb./bbl. | Viscosity Cpe. | Init. Gel G. | pH | 30' Corr. W. L. WL |
| None | | | | | | | 17 | | | | 60 |
| Ground oven-dried Potatoes (13.5% Moisture) | 43 | 15 | 30 | 15 | 0 | 0 | 17 | 9.0 | 31.0 | 1 | 7.00 | 5.35 |
| Do | 43 | 10 | 30 | 10 | 0 | 0 | 17 | 10.5 | 43.0 | 2 | 7.00 | 3.90 |
| Impermex | | | | | 26.0 | 5 | [1]10.0 | 23.0 | 0 | 7.30 | 3.90 |
| AFTER 18 HRS. ROLLING @ 150° F. | | | | | | | | | | | |
| None | | | | | | | 17 | | | | |
| Ground oven-dried Potatoes (13.5% Moisture) | 43 | 15 | 30 | 15 | 0 | 0 | 17 | 9.0 | 26.5 | 1 | 6.90 | 4.00 |
| Do | 43 | 10 | 30 | 10 | 0 | 0 | 17 | 10.5 | 37.0 | 2 | 7.00 | 3.70 |
| Impermex | | | | | 26.0 | 0 | [1]10.0 | 18.0 | 0 | 7.60 | 4.15 |

[1] Impermex (no potatoes present).

The above table shows the advantageous feature of this invention because raw potatoes, simply oven-dried and ground, may be used directly rather than first reducing the potato to a starch. In some insances it is desirable to dissolve the starch in a very concentrated brine, then dilute to a concentration known to produce gelatinization and finally dilute it to the concentration required for preservation.

The preserving action of sodium, calcium and magnesium chloride brines is shown in Table 7. Either 10.9% calcium chloride or 8% magnesium chloride brine was superior in preserving Impermex to a 20.2% sodium chloride brine.

*Table 7.—Preservation of an inoculated Impermex mud[1] with brines*

| Brine Used— | | Mud Characteristics (Muds aged at 130° F.) | | | | | | | |
|---|---|---|---|---|---|---|---|---|---|
| | | 30 Minute Corr. W. L. | | | | Ph. | | | |
| Amt. Percent | Type | Init. ml. | 2 Days ml. | 9 Days ml. | 23 Days ml. | Init. | 2 Days | 9 Days | 23 Days |
| 0 | Blank | 4.2 | 44.8 | | | 8.10 | 7.30 | | |
| 10.9[2] | CaCl₂ | 4.5 | 6.1 | 7.4 | 8.7 | 7.00 | 6.80 | 6.75 | 6.90 |
| 15.5[2] | CaCl₂ | 4.0 | 4.3 | 4.4 | 5.2 | 6.85 | 6.75 | 6.80 | 6.80 |
| 8.0[2] | MgCl₂ | 3.6 | 3.9 | 4.4 | 5.8 | 6.95 | 6.70 | 6.50 | 6.50 |
| 20.2 | NaCl (Sat.) | 4.9 | 19.9 | | | 7.65 | 7.30 | | |
| 26.0 | NaCl (Soln.) | 4.5 | 4.9 | 3.8 | 4.6 | 7.50 | 7.20 | 6.85 | 6.95 |

[1] 24% Hiko mud prepared in 2% salt water plus small amounts of three spoiled Impermex muds, plus 7 lbs./bbl. Impermex, added after adding preservative salt.
[2] 2% NaCl also present.

It will be seen from the above that the invention accomplishes its object. From the above description and the examples given, one skilled in the art is given a guide to apply the invention to any particular situation as may arise. The procedure is to secure gelatinization of a gelatinized starchy material by subjecting the ungelatinized material to the action of the brine of a concentration and at a temperature sufficient to gelatinize the starchy material. Examples of concentration and temperatures are given in illustrated embodiments to enable those skilled in the art to obtain the desired results. The amount of ungelatinized starchy material to employ in any particular drilling fluid will, of source, depend upon the requirements as to consistency and water loss desired or required in any particular well. But again, the above description furnishes a guide to those skilled in the art to obtain the desired results.

The concentration of the brine employed will be governed by the type of starchy product to be gelatinized, the type of brine used, the temperature of the brine, the minimum brine concentration that will preserve the starch, the degree of gel strength desired in the drilling fluid, the desired weight of the drilling fluid, and the nature of the formation to be drilled. In the interest of economy the brine concentration should be maintained at the minimum permissible after satisfying the above requirements.

Combinations of salts are useful in accordance with this invention; thus potato startch may be gelatinized in a calcium nitrate brine or in a brine containing calcium chloride and calcum nitrate.

The invention having been thus described, what is claimed is:

1. In the art of drilling wells by the employment of an aqueous clay-laden starchy drilling fluid subject to contamination by starch-degrading constituents, the process comprising, subjecting an ungelatinized starchy material to the action of a water-salt brine of a concentration of at least 16% between and at a temperature substantially below that required for fresh water, but both sufficient to gelatinize the starchy material and to inhibit degradation of the starch in the drilling fluid.

2. In the art of drilling wells by the employment of an aqueous clay-laden starchy drilling fluid subject to contamination by starch-degrading constituents, the process comprising, subjecting an ungelatinized starchy material to the action of a water-brine of a salt or composite of salts of a class consisting of the chlorides, bromides, iodides and nitrates of magnesium, calcium, strontium, barium, ammonium, sodium, potassium, mangnese and zinc, and of a concentration of at least 16% and at a temperature between 60° F. and 165° F. which is substantially below that required for fresh water, but both sufficient to gelatinize the starchy material and to inhibit degradation of the starch in the drilling fluid.

3. In the art of drilling wells by the employment of an aqueous clay-laden starchy drilling fluid subject to contamination by starch-degrading constituents, the process comprising, subjecting an ungelatinized starchy material to the action of a water-salt brine of a concentration of at least 16% and at a temperature between 60° F. and 165° F. which is substantially below that required for fresh water, but both sufficient to gelatinize the starchy material and reducing the concentration sufficient to preserve the starchy material when finally present in the drilling fluid.

4. In the art of drilling wells by the employment of an aqueous clay-starchy drilling fluid subject to contamination by starch-degrading constituents, the process comprising, subjecting an ungelatinized starchy material to the action of a water-salt brine of a concentration of at least 16% and at a temperature between 60° F. and 165° F. which is substantially below that required for fresh water, but both sufficient to gelatinize the starchy material and to inhibit degradation of the starch in the drilling fluid and drilling with such a brine containing the gelatinized starchy material and clay.

5. In the art of drilling wells by the employment of an aqueous clay-starchy drilling fluid subject to contamination by starch-degrading constituents, the process comprising, subjecting an ungelatinized starchy material to the action of a water-salt brine of a concentration of at least 16% and at a temperature between 60° F. and 165° F. which is substantially below that required for fresh water, but both sufficient to gelatinize the starchy material and to inhibit degradation of the starch in the drilling fluid and adding a clay to the brine containing the gelatinized starchy material.

6. In the art of drilling wells by the employment of an aqueous clay-laden starchy drilling fluid subject to contamination by starch-degrading constituents, the process comprising, subjecting an ungelatinized starchy material to the action of a water-salt brine containing a clay, with the brine of a concentration of at least 16% and at a temperature between 60° F. and 165° F. which is substantially below that required for fresh water, but both sufficient to gelatinize the starchy material and to inhibit degradation of the starch in the drilling fluid.

7. In the art of drilling wells by the employment of an aqueous clay laden clay-starchy drilling fluid subject to contamination by starch-degrading constituents, the process comprising, subjecting an ungelatinized starchy material to the action of a water-salt brine of a concentration of at least 16% and at a temperature between 60° F. and 165° F. which is substantially below that required for fresh water, but both sufficient to gelatinize the starchy material and reducing the concentration sufficient to preserve the starchy material and drilling with such a brine containing the gelatinized starchy material and a clay.

8. In the art of drilling wells by the employment of an aqueous clay-laden starchy drilling fluid subject to contamination by starch regrading constituents, the process comprising introducing the starchy material in a water-brine phase of an alkaline earth salt of a concentration of at least 16% and at a temperature between 60° F. and 165° F., and subsequently maintaining the concentration of the brine to at least 10% which is sufficient to inhibit deterioration of the starchy material during the course of drilling.

9. In the art of drilling wells by the employment of an aqueous clay-laden starchy drilling fluid subject to contamination by starch degrading constituents, the process comprising gelatinizing a starchy material in the brine of at least 16% concentration and at a temperature between 60° F. and 165° F., adding the starchy material so gelatinized to the drilling fluid and maintaining the brine concentration to at least 10% which is sufficient to inhibit deterioration of the starchy material during the course of drilling.

RAYMOND W. HOEPPEL.

REFERENCES CITED

The following references are of record in the file of this patent:

UNITED STATES PATENTS

| Number | Name | Date |
| --- | --- | --- |
| 2,349,049 | Means | May 16, 1944 |
| 2,364,434 | Foster | Dec. 5, 1944 |
| 2,399,986 | Chapman | May 7, 1946 |
| 2,417,307 | Larsen | Mar. 11, 1947 |
| 2,433,668 | Jones | Dec. 30, 1947 |

OTHER REFERENCES

Radley: Starch and Its Derivatives, 2nd ed., pub. 1944, D. Van Nostrand Co., N. Y., pages 49, 50, 51, 52, 273, 274. (Copy in Div. 43.)